United States Patent [19]

Pauliukonis

[11] Patent Number: 4,543,983
[45] Date of Patent: Oct. 1, 1985

[54] O-RING SOLENOID WATER VALVES

[76] Inventor: Richard S. Pauliukonis, 6660 Greenbriar Dr., Cleveland, Ohio 44130

[21] Appl. No.: 384,799

[22] Filed: Jun. 4, 1982

Related U.S. Application Data

[63] Continuation-in-part of Ser. No. 264,058, May 15, 1981, Pat. No. 4,441,687.

[51] Int. Cl.$^4$ .............................................. F16K 31/06
[52] U.S. Cl. ................................ 137/356; 251/129.01; 251/129.19; 137/550; 335/255
[58] Field of Search ................ 251/129, 141; 335/225; 137/356, 374, 550

[56] References Cited

U.S. PATENT DOCUMENTS

| 2,888,237 | 5/1959 | Dahl | 251/141 X |
| 3,295,079 | 12/1966 | Brown | 335/255 |
| 3,366,288 | 1/1968 | Goldschein | 251/141 X |
| 3,420,260 | 1/1969 | Wisniewski | 251/141 X |
| 3,556,070 | 12/1971 | Holcomb | 251/129 X |
| 3,670,768 | 6/1972 | Griswold | 251/141 X |
| 3,848,775 | 11/1974 | Possell | 251/141 X |
| 3,955,795 | 5/1976 | Neely | 251/129 |
| 4,010,769 | 3/1977 | De Lorenzo et al. | 251/141 X |
| 4,373,699 | 2/1983 | Leiberich | 251/141 X |

Primary Examiner—Arnold Rosenthal
Attorney, Agent, or Firm—R. S. Pauliukonis

[57] ABSTRACT

A simple solenoid operated valve for use with water and other fluids includes a valve operating section and a valving section interconnected by an elongated plunger passing therebetween by way of a simple separator spaced between said sections including a valving means in said valving section adaptable of maintaining valve in a first normally closed position wherein, when a solenoid coil is not energized, an end of said plunger which is contoured closes an inside diameter of a seal which may be of O-ring configuration bubble-tight shut while when the solenoid coil becomes energized electrically, rendering valve open for fluid communication between a first fluid supply and a second fluid exhaust port means incorporated into a valve housing adaptable of being produced from metal or plastics economically.

3 Claims, 2 Drawing Figures

O-RING SOLENOID WATER VALVES

This is a continuation-in-part of my divisional application Ser. No. 264,058 filed May 15, 1981 now U.S. Pat. No. 4,441,687, issued Apr. 10, 1984 from a U.S. Pat. No. 4,290,579 issued Sept. 22, 1981 on an application Ser. No. 972,287 filed Dec. 22, 1978.

This invention relates to solenoid operated valves in general, and to a simple design of valves which use plunger end countoured against an inside diameter of an O-ring seal to render valve bubble-tight shut in particular.

In the parent application it has been demonstrated vividly that the use of O-ring seals is quite beneficial in valving operation of simple O-ring solenoid valves. This is true in particular in applications which can tolerate fluid flow through the openings in solenoid coils without effecting fluid compatibility aspect. However, many of fluids are demanding more stringent requirements in valving, in particular those related to contamination and risk of exposure to the materials of construction from compatibility standpoint as well as safety, dictating a departure from the direct fluid flow through the solenoid to an indirect fluid flow through the valve housing located somewhat remote from the electrical operator such valves may entail.

The object of the present invention is therefore to provide a simple valve design wherein valving section is separated from the valve operating section.

Another object of this invention is to employ a simple O-ring seal for performing valving function in concert with a simple plunger end which is countoured and adaptable of closing an inside diameter of such O-ring seal by plain contact to render valve bubble tight shut until the plunger becomes lifted therefrom to render valve open when the solenoid becomes energized electrically.

Devices of this type which require fewer components for valve construction and operation are obviously desirable, in particular if they result in a simplified and less costly valve.

These and other objects and advantages of the invention will become more fully apparent from the description of the embodiment of the invention, taken together with the accompanying drawings:

IN THE DRAWINGS

Figure 1:
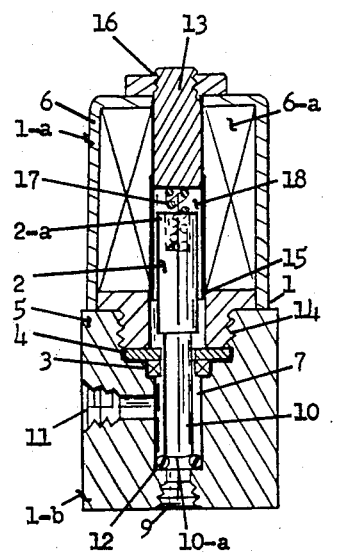
FIG. 1 is a cross-sectional view of an O-ring solenoid valve identifying basic valve components in detail, including a valve housing from metal.
Figure 2:
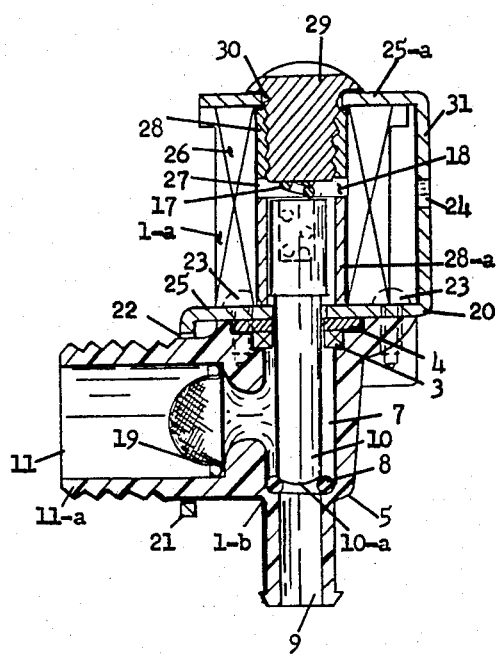
FIG. 2 is an identical valve to that of FIG. 1 in cross-section, except that the housing thereof is from plastics and includes a mounting bracket attached thereto.

Shown in FIG. 1 and FIG. 2 is a valve assembly 1 identifying clearly two separate parts thereof, such as a valve actuating section 1-a and a valving section 1-b interconnected by an elongated plunger 2 passing therebetween via a dividing seal separator 3 of preferably U-cup configuration but not limited thereto, topped by a washer 4, both secured permanently inside appropriate counterbores of a housing 5 of valving section 1-b by parts of valve actuating section 1-a attached thereto so as to insure a complete division of both sections in service. Except for attachment means, both FIGS. 1 and 2 show basically identical housing 5 provided with a central housing bore 7 of a diameter slightly larger than that of plunger portion 10 for flow of fluid therebetween and adaptable of receiving frictionally a slightly oversized seal 8 in a counterbore 12 at the bore end terminating with a coaxial exhaust port means 9 which is normally closed when plunger end 10-a is seated over seal 8 as shown therein while pressurized water or other fluids enter said bore 7 by way of a side port 11 of housing 5 perpendicularly as shown in FIGS. 1 and 2 clearly. Side port 11 may be provided with a male extension 11-a shown in FIG. 2 or it may be a plain female port, threaded as shown in FIG. 1. In FIG. 1 we also find that the valve actuating section 1-a is comprised of a standard solenoid operator 6 consisting of a tube assembly 15 of which a top end 16 terminates with a ferromagnetic stop 13 entering tube nearly halfway towards the bottom end thereof which terminates with a hub 14 threaded to facilitate an easy attachement thereof to a mating opening in housing 5 to complete valve assembly when seal 3 with washer 4 together with plunger 2 backed up by a biasing compression spring 17 is placed therein. In effect, when a solenoid coil 6-a becomes placed over the outside diameter of tube assembly 15, the solenoid operator 6 becomes an independent valve operating section which turns to actuating section 1-a thereafter when assembled into the housing 5 together with plunger 2 so as to establish an air gap 18 between opposing faces of a plunger end 2-a and that of the stop 13. Only when solenoid coil 6-a becomes energized electrically, the opposing faces of plunger end 2-a and stop 13 meet eliminating air gap 18 altogether due to a powerful magnetic force solenoid exerts lifting plunger 2 from the first valve normally closed bubble-tight position against spring 17 to render valve open while simultaneously unseating plunger end 10-a which may be contoured from seal 8 representing a valving means of valving section 1-b for fluid exhaust via exhaust port means 9 for as long as the solenoid is energized electrically thereby allowing fluid communication between fluid supply port 11 and exhaust port means 9 until the solenoid coil becomes de-energized eliminating said magnetic force and allowing said biasing spring 17 return plunger 2 back into the original position for re-establishing air gap 18 in valve actuating section 1-a and rendering valve bubble-tight closed when plunger end 10-a closes seal 8 inside valving section of the valve, and vice-versa wherein repeated energization of the solenoid electrically renders valve open position while de-energization of the solenoid renders valve automatically closed.

It should be emphasized here that although the valve design of FIG. 1 satisfies all set objectives for this invention, from standpoint of mass production wherein housing 5 may be produced by injection molding considerably cheaper than that produced by machining from metal FIG. 1 shows, design of FIG. 2 was needed from economy standpoint alone, since otherwise both valves are identical in component function and operation.

By reference to FIG. 2 it was necessary to introduce a valve mounting bracket to the valve housing 5 produced from plastics along with further simplification of parts in both valve actuating and valving sections to make it economical and trully attractive from cost standpoint, in particular in light of existing prior art valves which are not only too complicated to produce but to assemble as well.

As can be seen from FIG. 2, valve housing 5 when produced from plastics by injection molding could include already mentioned male side port extension 11-a which may be provided with a customary screen 19 on the inside diameter thereof while the fluid exhaust port means 9 may be barbed as shown. Instead of a threaded hub 14 of FIG. 1 for attaching valve operating section 1-a to the valving section 1-b in FIG. 2, a metallic bracket 20 bent on 90 degree angles is used so as to not only provide physical support to the protruded side extension 11-a by a downward directed vertical bracket leg 21 provided with a hole 22 of close diameter to that of the extension 11-a but also to secure said bracket on four corners to the housing by screws 23 passing holes in the corners of the bracket horizontal section 25 to enter holes of the plastic housing 5 as shown by dotted lines in FIG. 2 and to secure seal 3 topped by washer 4 inside appropriate counterbores thereof, as well as to provide a valve mounting means in service by holes 24 on the back of a vertical central section 31 which finally terminates with a second horizontal section 25-a bent from central section on 90 degree angle on the top of bracket 20. Between bracket horizontal sections 25 and 25-a a solenoid coil 26 having a bore 27 provided with short tubular sections 28 and 28-a respectively by interference fit so as to serve as magnetic poles when interconnected magnetically by bracket sections 25,31 and 25-a can be placed sideways therebetween and secured to top pole piece 28 via a clearance hole 30 in bracket section 25-a by a ferromagnetic top screw 29 that doubles also as a stop for plunger 2 provided at the top end 2-a with spring 17 in final assembly to function exactly as the valve of FIG. 1.

In operation, both of the designs of FIGS. 1 and 2 remain normally closed as shown, with plunger end 10-a seated over seal 8 to maintain valve bubble-tight shut until the solenoid coil of valve operating section 1-a becomes electrically energized, moving magnetically plunger 2 with a force large enough to close air gap 18 against an opposing force spring 17 exerts constantly therein between plunger and stop end faces while allowing fluid communication between fluid supply and exhaust ports until de-energization of the solenoid materializes, automatically returning plunger 2 back to the original valve closed position, and vice versa.

It has been determined experimentally that the valve of the present invention allows extremely large flows to pass therethrough, earlier unatainable by any known solenoid valve operated with conventional plungers. This is so because of the use of O-ring seal for valving which is not only easy to assemble but also to replace in the field during the maintenance of the valve. It is not to say that the design is limited to O-ring seals. In fact, a piece of an elastomer tubing of disc configuration was cut out and placed frictionally in place of O-ring seal 8 with equal success. The same can be said the slightly larger second seal 3 of U-cup configuration which too can be replaced by an O-ring with equal success, depending on system pressures valved with this type of valve which allows handling fluids of any sort without wetting electrical parts because seal 3 is intended to prevent any fluid entrance into the valve operating section 1-a at all times. Ergo, preparing plunger end 10-a by appropriate contour so as to attain complete coverage of seal used for valving means inside of valve housing 5 in combination with the seal be it O-ring seal 8 or replacement thereof in a form of elastomer disc made from material compatible with fluids valved is vital to the successful operation of valve 1 of the present invention. These and also other changes eliminating or adding certain specific structural or procedural features or details may be made in the above described O-ring valve without departing from the invention.

What is claimed is:

1. A water valve comprising:

a valve housing provided with fluid inlet and outlet port means including a valving means and means for actuating said valving means in an operable relationship with an elongated plunger movable by a solenoid spaced atop thereof and secured thereto, said solenoid including a coil with a bore passing therethrough between a first top end and a second bottom end thereof, a pair of short tubular magnetic sections in said bore inserted therein one in said top and another is said bottom ends thereof respectively, said tubular sections serving as magnetic poles subject to induced magnetic force when said solenoid is energized electrically, including a ferromagnetic bracket covering said coil so as to be in contact with said tubular sections structurally, said top tubular section provided with a bracket holding screw that doubles as a stop for said plunger, said plunger disposed so as to have a first top end thereof enter said bore of said coil partway inwardly adjacent said stop forming an air gap therebetween when said solenoid coil is not energized electrically while a second bottom end thereof enters a coaxial bore of said valve housing provided with a frictionally secured valving seal, means to separate a valve operating section containing said solenoid from a fluid valving section containing said valving means by the use of a seal spaced therebetween and secured sealably to prevent fluid flow between said valve operating and said valving sections respectively, a small spring inside said first top plunger end abutting said stop, said valving means further including a side port for fluid supply to said housing bore and a bottom fluid discharge port directly opposite to said bore of said coil but substantially in line therwith so that both said fluid valving and said operating sections function during a position change of said plunger from a first normally closed to a second open position when said solenoid coil is energized electrically to exert magnetic force capable of plunger lifting against said stop while closing said air gap thereby permitting fluid communication between said side fluid supply and said bottom fluid discharge ports until said solenoid becomes de-energized electrically to render valve normally closed by a biasing force said small spring exerts in opposite direction to the direction the magnetic force of said solenoid coil exerts over said plunger, means for attaching said valve actuating section to said valving section including a valve assembly bracket that doubles as valve mounting bracket, said bracket formed so as to provide a support for a tubular sideways protruding external section of said side port by way of an opening in a vertical leg thereof while a first horizontal section of said bracket formed adjacent thereto on a 90 degree angle is firmly secured therein by way of corresponding holes in said housing, atop of said washer, including a clearance hole for said plunger in said horizontal section, and an adjacent vertical center section slightly offset on a side thereof, opposite to said vertical bottom leg, formed again on a 90 degree angle relative to said first horizontal section, including a set of valve mounting holes in said vertical center section, and an adajcent second horizontal section on top of said bracket bent on another 90 degree angle from said vertical central section so as to complete a magnetic pathway for opposing magnetic poles of said solenoid, including a central mounting opening in said top of said bracket adaptable of receiving a plunger stop in final assembly of the valve, said solenoid spaced between said horizontal bracket sections including said tubular sections as inserts, and a first insert spaced inside said bore of said solenoid adjacent said first horizontal bracket section surrounding said plunger of said first valve actuating section while a second insert is spaced inside said bore opposite said first insert adajcent said second horizontal bracket section provided with said plunger stop on top thereof.

2. A valve as in claim 1 wherein said tubular sideways protruding section of said side port includes a screen.

3. A valve as in claim 1 wherein said tubular sideways protruding section of said saide port includes a screen spaced inside therein while the outside thereof is threaded for connecting to a fluid supply source supplying water or the like to the valve.

* * * * *